Patented Aug. 2, 1927.

1,637,791

UNITED STATES PATENT OFFICE.

JAN TEPPEMA, OF AKRON, OHIO, ASSIGNOR TO THE GOODYEAR TIRE & RUBBER COMPANY, OF AKRON, OHIO, A CORPORATION OF OHIO.

ART OF VULCANIZING RUBBER.

No Drawing. Original application filed February 12, 1926, Serial No. 87,949. Divided and this application filed November 3, 1926. Serial No. 146,068.

My invention relates to the art of manufacturing vulcanized rubber compositions and it has particular reference to the employment of a class of chemical compounds that accelerate the process of vulcanization.

The object of the invention is to provide a new class of chemical compounds that are capable of accelerating the vulcanization reactions and imparting desirable physical properties to the vulcanizate.

A generic class of chemical compounds embodying a thiazole group as a part of their structure is disclosed in the patent to Sebrell and Bedford, No. 1,544,687, July 5, 1925. These compounds, particularly those having a mercapto group joined to the thiazole ring, at position 2, indicated under approved nomenclature, have been found to be excellent accelerators. A specific compound of this class is 2-mercaptobenzothiazole:

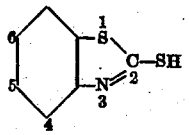

which may be regarded as a species of the sub-generic class of thiazoles designated as mercaptoarylthiazoles.

In a copending application filed in the name of Lorin B. Sebrell, Serial Number 87,950, dated February 12, 1926, there is disclosed a large number of substances, that have been discovered to be suitable for use as accelerators. This class of compounds includes addition or substitution products of chemicals having as a part of their structure a thiazole group, as for example, 6-nitro-2-mercaptobenzothiazole:

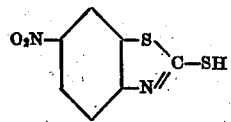

The present disclosure relates to certain species of the substitution or addition products of mercaptothiazoles, and it has particular reference to the halogen derivatives and the salts thereof that have been found to be useful in the manufacture of rubber products. It is deemed unnecessary for a proper understanding of this invention to describe the various methods of forming these compounds, inasmuch as certain methods are known and others are disclosed in the copending application of Sebrell and Teppema, Serial Number 37,861, filed June 7, 1925.

Accelerators that impart desirable qualities to the rubber compositions are produced by joining to the adjacent carbon atoms of the thiazole ring, one or more radicals that include a halogen atom. The radicals so added may be either aliphatic or cyclic, and may be aryl radicals having a portion of their structure common to the thiazole ring. An example of the latter group is 2-mercaptobenzothiazole, a species of the class of mercaptoarylthiazoles, which may be united with a halogen atom to form a compound of the class specified herein.

A compound that may be regarded as typical of halogen mercaptobenzothiazoles is 5-chlor-2-mercaptobenzothiazole, represented structurally as:

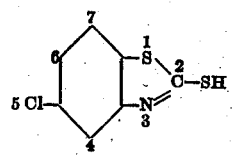

This compound may be prepared from 1-4-dichlor-nitro-benzene. 1-4-dichlor 2-nitrobenzene is treated with sodium hydrosulphide and carbon bisulphide in an aqueous solution under ordinary or slightly increased pressure. The reactions may be indicated as follows:

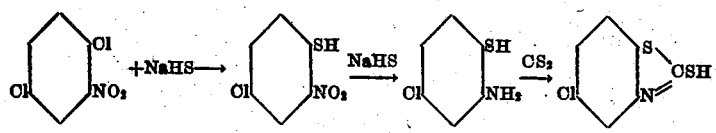

An isomer of this material, the 6-chlor 2-mercaptobenzothiazole, which may be prepared conveniently by diazotizing 6-amido 2-mercaptobenzothiazole is likewise an accelerator having desirable properties. It may be designated structurally in this manner:

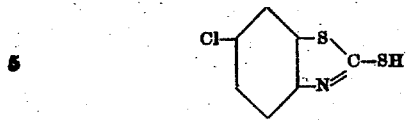

Many derivatives including the metallic salts, disulfide or the corresponding tolyl, naphthyl and anisyl thiazole are merely modifications of the broad idea, which has been set forth above. The following are representative results which have been obtained when this class of materials were compounded in a mix having the following ratio of ingredients: 100 parts rubber, 5 parts ZnO, 3 parts sulfur, 0.5 part accelerator.

| Accelerator. | Time of cure steam pressure 20 lbs. guage. | Tensile strength kgs/cm². | Elongation per cent. |
|---|---|---|---|
| | Hrs. mins. | | |
| 2-mercaptobenzothiazole | 40 | 130 | 785 |
| 5-chlor-2-mercaptobenzothiazole | 40 | 155 | 845 |
| 5-chlor-6-nitro-2-mercaptobenzothiazole | 1  20 | 90 | 860 |
| Zinc salt of 5-chlor-6-nitro-2-mercaptobenzothiazole | 1  20 | 105 | 870 |

The principles of the invention have been disclosed with particular reference to a few specific compounds which fall within the scope thereof, but it is to be understood that these are presented as exemplifying the invention rather than limiting it. It is intended, therefore, that only those limitations should be imposed which are required by the scope of the following claims.

What I claim is:

1. A method of accelerating the vulcanization of caoutchouc that comprises vulcanizing the same in the presence of a metallic salt of a halogen derivative of a mercaptobenzothiazole.

2. A method of accelerating the vulcanization of caoutchouc that comprises vulcanizing the same in the presence of a zinc salt of a halogen derivative of a mercaptobenzothiazole.

3. A method of accelerating the vulcanization of caoutchouc that comprises vulcanizing the same in the presence of a metallic salt of a chlorine derivative of a mercaptobenzothiazole.

4. A method of accelerating the vulcanization of caoutchouc that comprises vulcanizing the same in the presence of a zinc salt of a chlorine derivative of a mercaptobenzothiazole.

5. A method of accelerating the vulcanization of caoutchouc that comprises vulcanizing the same in the presence of a metallic salt of a halogen derivative of a mercaptobenzothiazole having a nitrogen containing group substituted in its aryl structure.

6. A method of accelerating the vulcanization of caoutchouc that comprises vulcanizing the same in the presence of a metallic salt of a halogen derivative of the mercaptobenzothiazole having an amido group substituted in its aryl structure.

7. A method of accelerating the vulcanization of caoutchouc that comprises vulcanizing the same in the presence of a zinc salt of a halogen derivative of a mercaptobenzothiazole having a nitrogen containing group substituted in its aryl structure.

8. A method of accelerating the vulcanization of caoutchouc that comprises vulcanizing the same in the presence of a zinc salt of a halogen derivative of a mercaptobenzothiazole having an amido group substituted in its aryl structure.

9. A method of accelerating the vulcanization of caoutchouc that comprises vulcanizing the same in the presence of a zinc salt of a chlorine derivative of a mercaptobenzothiazole having a nitrogen containing group substituted in its aryl structure.

10. A method of accelerating the vulcanization of caoutchouc that comprises vulcanizing the same in the presence of a zinc salt of 5-chlor 6-amido 2-mercaptobenzothiazole.

11. A caoutchouc that has been vulcanized in the presence of a metallic salt of a halogen derivative of a mercaptobenzothiazole.

12. A caoutchouc that has been vulcanized in the presence of a zinc salt of a halogen derivative of a mercaptobenzothiazole.

13. A caoutchouc that has been vulcanized in the presence of a metallic salt of a chlorine derivative of a mercaptobenzothiazole.

14. A caoutchouc that has been vulcanized in the presence of a zinc salt of a chlorine derivative of a mercaptobenzothiazole.

15. A caoutchouc that has been vulcanized in the presence of a zinc salt of 5-chlor-6-amido 2-mercaptobenzothiazole.

In witness whereof, I have hereunto signed my name.

JAN TEPPEMA.